United States Patent [19] [11] Patent Number: 6,068,935
Hayami et al. [45] Date of Patent: May 30, 2000

[54] THERMOPLASTIC POLYESTER RESIN, AND INSULATED WIRE, ELECTRICALLY INSULATED CABLE AND HEAT-SHRINKABLE TUBE EACH MADE WITH THE RESIN

[75] Inventors: Hiroshi Hayami, Osaka; Harumi Kanke; Akira Yamabayashi, both of Gifu, all of Japan

[73] Assignees: Sumitomo Electric Industries, Ltd.; The Nippon Synthetic Chemical Industry, both of Osaka, Japan

[21] Appl. No.: 09/401,290

[22] Filed: Sep. 23, 1999

[30] Foreign Application Priority Data

Sep. 24, 1998 [JP] Japan ................................... 10-285858

[51] Int. Cl.$^7$ ............................ B32B 27/06; C08G 63/08
[52] U.S. Cl. ........................ 428/482; 528/272; 528/302; 528/308; 528/308.6; 528/354; 528/361; 428/35.7; 428/36.92; 428/480
[58] Field of Search ...................... 528/272, 302, 528/308, 308.6, 354, 361; 428/35.7, 36.92, 480, 482

[56] References Cited

U.S. PATENT DOCUMENTS

| 4,340,519 | 7/1982 | Kotera et al. | 523/414 |
| 4,649,082 | 3/1987 | Friedlander | 428/461 |
| 4,888,381 | 12/1989 | Pankratz | 524/751 |
| 4,933,214 | 6/1990 | Sugiura et al. | 427/379 |

Primary Examiner—Samuel A. Acquah
Attorney, Agent, or Firm—Smith, Gambrell & Russell, LLP

[57] ABSTRACT

A thermoplastic polyester resin represented by general formula (1) or (2) which has a melt index of from 1 to 50. The polyester resin is excellent in flexibility, flame retardancy, and thermal aging resistance. The electric wire, insulated cable, and heat-shrinkable tube obtained with the resin are excellent also in abrasion resistance:

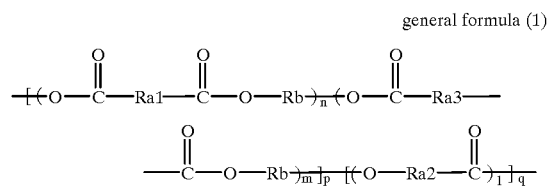

general formula (1)

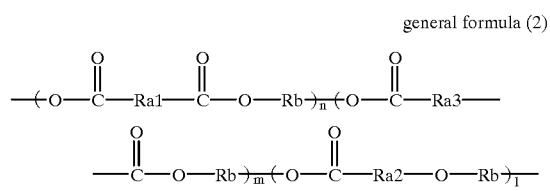

general formula (2)

wherein
Ra1 is an aromatic and/or aliphatic hydrocarbon group;
Ra2 is a hydrocarbon group;
Ra3 is an aliphatic hydrocarbon group having a C=C bond;
Rb is a hydrocarbon group; and
l, m, n, p and q each is a positive integer.

8 Claims, 2 Drawing Sheets

THERMOPLASTIC POLYESTER RESIN, AND INSULATED WIRE, ELECTRICALLY INSULATED CABLE AND HEAT-SHRINKABLE TUBE EACH MADE WITH THE RESIN

FIELD OF THE INVENTION

The present invention relates to a thermoplastic polyester resin which is excellent in flexibility, abrasion resistance, heat resistance, and thermal aging resistance and is suitable for use in atmospheres where a high degree of resistance to heat, thermal aging, and abrasion is required, as in automotive engine rooms. The present invention further relates to an insulated wire, an electrically insulated cable, and a heat-shrinkable tube each made with the thermoplastic polyester resin.

More particularly, the thermoplastic polyester resin of the present invention is characterized in that it comprises structural units containing ones having a crosslinkable unsaturated bond and hence comes, through crosslinking, e.g., by irradiation with a radiation, to have exceedingly high resistance to heat and thermal aging in addition to the performances inherent in the polyester resin (i.e., excellent flexibility, abrasion resistance, heat resistance, and thermal aging resistance).

BACKGROUND OF THE INVENTION

Wiring materials such as insulated wires and heat-shrinkable tubes for use in harnesses to be attached in automotive engine rooms should employ or comprise resin materials excellent not only in flexibility but in flame retardancy, heat resistance, thermal aging resistance, oil resistance, and abrasion resistance, from the standpoints of harness handleability, etc. Hitherto, several kinds of polymers including crosslinked poly(vinyl chloride), crosslinked polyethylene, and fluorinated polymers have been properly used according to required temperature ratings.

In the field of motor vehicles, on the other hand, there is a trend toward weight reduction in automotive parts for improving fuel efficiency so as to cope with environmental problems. With respect to insulated wires also, investigations have been made on the use of thinner conductors and the thickness reduction in insulating coating layers.

The insulated wires currently most frequently used in engine room harnesses are the so-called AVX (automotive low-voltage wire insulated by crosslinked PVC; temperature rating, 110° C.) and AEX (automotive low-voltage wire insulated by crosslinked PE; temperature rating, 120° C.) each having an insulator thickness of 0.5 mm. However, from the standpoint of the desire for thickness reduction, thinly coated wires have been put to practical use, such as the so-called AVSSX (automotive low-voltage wire insulated by ultrathin crosslinked PVC; temperature rating, 110° C.) and AESSX (automotive low-voltage wire insulated by ultrathin crosslinked PE; temperature rating, 120° C.) each designed to have an insulator thickness of 0.30 mm.

However, the desire for thickness reduction becomes stronger year by year, and investigations are being made in order to develop an insulated wire in which the thickness of the insulating layer has been reduced to 0.20 mm or 0.10 mm.

Furthermore, with the trend toward increase in automotive performance, the engine room is coming to heat up to a higher degree and the number of electrical equipment parts is increasing. The requirements for improvements in the thermal aging resistance of the harnesses to be connected to these electrical equipment parts also are becoming severer year by year. As a result, there is a desire for an insulated wire having an insulator thickness of 0.2 mm and a temperature rating of 125° C. or 150° C.

The properties required of automotive electric wires are prescribed in detail in standards including ISO 6722. Among these properties, abrasion resistance and thermal aging resistance are properties which are thought to be more difficult to attain as the insulator becomes thinner.

Hitherto, abrasion resistance has been evaluated by the so-called tape abrasion test method illustrated in FIG. 1. However, with decreasing insulator thickness, the scrape abrasion test method illustrated in FIG. 2 has come to be used for the evaluation because it has become necessary to more properly evaluate reliability concerning abrasion resistance.

FIG. 1 is a diagrammatic view illustrating the tape abrasion test method conventionally used for examining the abrasion resistance of electric wires.

In this test, a load 3 of 453 g is imposed on an electric wire sample 1. A #150 sandpaper 2 is placed beneath the sample 1, and is caused to run at a constant rate to measure the distance through which the sandpaper has run until the conductor in the insulated wire 1 is exposed.

FIG. 2 is a diagrammatic view illustrating the scrape abrasion test method used in the present invention for examining the abrasion resistance of electric wires.

In this scrape abrasion test method, a load 3 of 714 g is imposed on a steel bar 4 having an outer diameter of 0.45 mm. This steel bar 4 is reciprocated on an electric wire sample 1 to scrape the sample, and the number of reciprocations required for the steel bar 4 to come into electrical contact with the conductor of the insulated wire is determined.

The durability level generally required in the above test is 300 reciprocations or higher. However, the thinner the insulator layer, the more the desired durability is difficult to attain.

With respect to thermal aging resistance, on the other hand, an insulated wire is required to have such a property that after the sample is subjected to 10,000-hour thermal aging at a rated temperature, the electrical properties of the sample and the mechanical properties of the insulator are higher than given levels. This requirement also tends to become more difficult to satisfy as the insulator layer becomes thinner.

If the electric wires insulated by crosslinked poly(vinyl chloride) or crosslinked polyethylene are designed to have an insulator thickness reduced to below 0.30 mm, it is difficult to attain the abrasion resistance of 300 reciprocations or higher and to meet the thermal aging resistance of 120° C. in terms of temperature rating.

In contrast, electric wires insulated by a fluorinated polymer, even when having a reduced insulator thickness, can satisfy the requirements concerning abrasion resistance and thermal aging resistance. However, these insulated wires have a drawback that the parts to which they are applicable are limited mainly because of their cost. It has hence become necessary to investigate new insulating materials.

Use of various thermoplastic elastomers is being investigated as insulating materials which may satisfy such requirements concerning thickness reduction and flexibility, abrasion resistance, thermal aging resistance, cost, etc.

Among these elastomers, polyester type thermoplastic elastomers (hereinafter abbreviated as polyester elastomers) are the most attractive polymers because they are excellent not only in flexibility but in abrasion resistance and thermal aging resistance.

The polyester elastomers are block copolymers comprising a crystalline hard segment such as poly(butylene terephthalate), made up of repeating units derived from terephthalic acid and 1,4-butanediol, and a noncrystalline soft segment derived from a polyether glycol, e.g., polytetramethylene glycol, or ε-caprolactone.

Of these polymers, a block copolymer elastomer comprising poly(butylene terephthalate) as a hard segment and an aliphatic polyester derived from ε-caprolactone as a soft segment is known as a polymer having excellent thermal aging resistance.

This block copolymer elastomer is produced, for example, by a process comprising polymerizing terephthalic acid with 1,4-butanediol using a polymerization catalyst, e.g., an organotitanium catalyst, to obtain a prepolymer and adding ε-caprolactone to the prepolymer to further conduct polymerization. By changing the proportion of the hard segment to the soft segment, various grades have been developed which range in modulus of elasticity from 1,000 to 10,000 $kg/cm^2$.

The present inventors used two polyester elastomers having moduli of elasticity of about 1,500 $kg/cm^2$ and about 5,500 $kg/cm^2$, respectively, to coat over a conductor having an outer diameter of 0.80 mm by extrusion coating with an extruder in two thicknesses of 0.20 mm and 0.50 mm for each elastomer. The insulated wires thus obtained were examined for abrasion resistance and thermal aging resistance.

Abrasion resistance was evaluated by the scrape abrasion test method illustrated in FIG. 2. With respect to thermal aging resistance, 0.20 mm-thick insulator samples (length, 200 mm) were subjected to a thermal aging test by the Arrhenius method, in which the samples were hung down in three Geer ovens respectively controled so as to have temperatures of 140° C., 160° C., and 180° C. and the time period required for each insulator sample to have an elongation reduced to 50% was measured. From these results, the temperature at which 10,000-hour aging resulted in an elongation of 50%, i.e., the temperature rating for 10,000-hour aging, was determined.

The results obtained are shown in Table 1.

TABLE 1

| Modulus of elasticity of polyester ($kg/cm^2$) | 1500 | | 5500 | |
|---|---|---|---|---|
| Melting point of polyester (° C.) | 200 | | 216 | |
| Thickness of insulator (mm) | 0.2 | 0.5 | 0.2 | 0.5 |
| Abrasion resistance (number of reciprocations) | 15 | 180 | 130 | 1700 |
| Thermal aging life (hour) 200° C. | 240 | | 80 | |
| 180° C. | 670 | | 288 | |
| 160° C. | 1900 | | 530 | |
| Temperature rating for 10,000-hr aging (° C.) | 131 | | 102 | |
| Volume resistivity (Ωcm) | | 1.3E + 12 | | 4.4E + 13 |

As shown in Table 1, the electric wires insulated by the polyester elastomer having a modulus of elasticity of 1,500 $kg/cm^2$ had an insulator temperature rating of about 131° C., showing that these insulated wires had thermal aging resistance sufficient for 125° C. rating. However, with respect to abrasion resistance, the insulated wires having insulator thicknesses of 0.20 mm and 0.50 mm, respectively, had numbers of reciprocations of 15 and 180, respectively, which were below the required value of at least 300. That polyester was thus found to have an insufficient abrasion resistance for use as an insulator for thinly insulated wires.

On the other hand, the electric wires insulated by the polyester elastomer having a modulus of elasticity of 5,500 $kg/cm^2$ had an abrasion resistance as high as 1,700 reciprocations when the insulator thickness was 0.50 mm. However, the insulated wire having an insulator thickness of 0.20 mm had an abrasion resistance of 130 reciprocations, which was below the required value of at least 300. Furthermore, this insulator had a temperature rating as poor as about 102° C. The above polyester was thus found to be insufficient in both abrasion resistance and thermal aging resistance when used as the insulator of thinly insulated wires.

In addition, the following was found. The insulator made of the polyester elastomer having a modulus of elasticity of 5,500 $kg/cm^2$ had relatively satisfactory insulating properties with a volume resistivity of $4.4 \times 10^{13}$ Ωcm. However, the insulator made of the polyester elastomer having a modulus of elasticity of 1,500 $kg/cm^2$ had a volume resistivity as low as $1.3 \times 10^{12}$ Ωcm, showing that this elastomer was somewhat problematic in electrical insulating properties.

From the standpoint of improving the thermal aging resistance of polyester resins, JP-A-9-227661 (the term "JP-A" as used herein means an "unexamined published Japanese patent application") discloses a polyester resin composition which is crosslinkable by irradiation with actinic energy rays, e.g., electron beams.

The polyester resin disclosed in the above reference comprises (1) units derived from an acid ingredient (A) comprising (A1) terephthalic acid or a lower alkyl ester thereof, (A2) an aromatic dicarboxylic acid other than terephthalic acid or a lower alkyl ester thereof, and (A3) an aliphatic dicarboxylic acid and/or an aliphatic hydroxycarboxylic acid and (2) units derived from a glycol ingredient (B) comprising (B1) an aliphatic linear diol having 2 to 4 carbon atoms and/or (B2) an aliphatic linear diol having 5 or more carbon atoms, wherein the molar ratio of (A1)/(A2)/(A3) is (35–75)/(20–30)/(20–50) and the molar ratio of (B1)/(B2) is (70–100)/(0–30).

Also disclosed in the above reference are: a random copolyester resin produced through polymerization for which the monomer ingredients (A) and (B) are introduced into a reactor at a time; and a resin composition containing a polyfunctional monomer having the effect of accelerating crosslinking.

The present inventors evaluated the above prior art technique in the following manner. An example of the above polyester resin was produced by introducing (A1) dimethyl terephthalate, (A2) dimethyl isophthalate, (A3) ε-caprolactone, and (B) 1,4-butanediol into a reactor at a time in a molar proportion of 4.4/1.9/3.7/10.0 and polymerizing the same. This polyester had a melting point of 140° C. (melt flow rate, 39; modulus of elasticity, about 1,400 $kg/cm^2$). A hundred parts by weight of the polyester was melt-mixed with 10 parts by weight of trimethylolpropane triacrylate as a polyfunctional monomer and 1 part by weight of a hindered phenol antioxidant (Irganox 1010, trade name, manufactured by Ciba-Geigy Ltd.) by means of a twin-screw extruder to prepare a resin composition. A conductor having an outer diameter of 0.80 mm was extrusion-coated with the composition in thicknesses of 0.5 mm and 0.20 mm. The coated conductors were irradiated with electron beams at an accelerating voltage of 1 MeV in a dose of 200 kGy. The insulated wires thus obtained were evaluated for abrasion resistance and thermal aging resistance.

TABLE 2

| | | |
|---|---|---|
| Modulus of elasticity of polyester (kg/cm$^2$) | | 1400 |
| Melting point of polyester (° C.) | | 140 |
| Thickness of insulator (mm) | 0.2 | 0.5 |
| Abrasion resistance (number of reciprocations) | 13 | 370 |
| Thermal aging life (hour) 200° C. | melted | melted |
| 180° C. | melted | melted |
| 160° C. | 3800 | — |
| Temperature rating for 10,000-hr aging (° C.) | — | — |

As a result, as Table 2 shows, the insulated wire having an insulator thickness of 0.5 mm had an abrasion resistance of 370 reciprocations, whereas that having an insulator thickness of 0.20 mm had an abrasion resistance of 13 reciprocations. Namely, the abrasion resistance of each insulated wire was below the required value of at least 300.

With respect to thermal aging resistance, the samples suffered melting and sagging in the thermal aging test at 180° C. and 160° C. and were unable to retain their shape. Hence, elongation measurement was impossible. Samples having a thickness of 0.5 mm also were tested. As a result, the same melting phenomenon occurred and elongation measurement was impossible.

JP-A-55-56135 discloses a process for producing a molded polyester elastomer crosslinked by irradiation with actinic energy rays, e.g., γ-rays, likewise from the standpoint of improving the thermal aging resistance and other properties of polyester resins.

This process comprises subjecting an acid ingredient (1) comprising an aromatic dicarboxylic acid (A) and an aliphatic dicarboxylic acid and/or an aliphatic hydroxycarboxylic acid (B) to polycondensation with a diol ingredient comprising an aliphatic glycol (C) to produce a linear copolyester, molding the copolyester, if desired after an aliphatic unsaturated compound is incorporated thereinto, and then irradiating the molding with a radiation to crosslink the copolyester.

In Examples given in the above reference, crosslinking accelerators such as diallylglycidyl isocyanurate and triallyl isocyanurate are used as the aliphatic unsaturated compound to obtain crosslinkable polyester resins.

However, the above molded polyester elastomer was found to have the same problems as the polyester resin disclosed in JP-A-9-227661.

Although there is a description in JP-A-55-56135 to the effect that various compounds may be copolymerized as the aliphatic unsaturated compound in the form of a dicarboxylic acid, no experiments are given therein in which such various compounds are actually used. There is no description in the above reference concerning specific conditions for producing such a copolyester resin, properties of the resin obtained, etc.

As described above, although various polyester resins excellent in flexibility, abrasion resistance, and thermal aging resistance have been developed, use of these prior art resins in thinly insulated wires encounters difficulties in attaining both abrasion resistance and thermal aging resistance or the like. There has hence been a desire for the development of a polymer which not only has excellent flexibility but satisfies requirements concerning abrasion resistance, thermal aging resistance, electrical insulating properties, etc.

SUMMARY OF THE INVENTION

The present inventors made intensive investigations on the problems described above. As a result, they have found that a novel thermoplastic polyester resin represented by general formula (1) or (2) which comprises monomer units derived from an acid ingredient (A) comprising (A1) an aromatic dicarboxylic acid and/or an aliphatic dicarboxylic acid, (A2) an aliphatic hydroxycarboxylic acid, and (A3) an aliphatic dicarboxylic acid having a carbon-carbon unsaturated bond in the molecule and monomer units derived from a glycol ingredient (B) comprising an aliphatic diol is excellent not only in flexibility, thermal aging resistance, and abrasion resistance but in electrical insulating properties, and that this polyester resin is useful in a wide range of molded objects including insulated wires, insulated cables, and heat-shrinkable tubes. The present invention has been completed based on this finding.

The present invention provides:

(1) a thermoplastic polyester resin represented by general formula (1) or (2) which comprises monomer units derived from an acid ingredient (A) comprising (A1) an aromatic dicarboxylic acid and/or an aliphatic dicarboxylic acid, (A2) an aliphatic hydroxycarboxylic acid, and (A3) an aliphatic dicarboxylic acid having a carbon-carbon unsaturated bond in the molecule and monomer units derived from a glycol ingredient (B) comprising an aliphatic diol, said thermoplastic polyester resin having a melt index MI (measured at 230° C. under a load of 2.16 kg) of from 1 to 50:

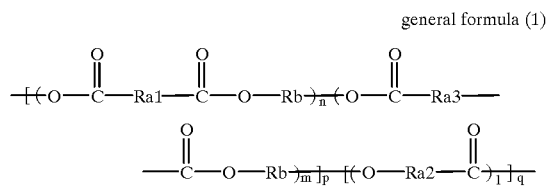

general formula (1)

(wherein

Ra1 is an aromatic and/or aliphatic hydrocarbon group (derived from monomer (A1));

Ra2 is a hydrocarbon group (derived from monomer (A2));

Ra3 is an aliphatic hydrocarbon group having a C=C bond (derived from monomer (A3));

Rb is a hydrocarbon group (derived from monomer (B)); and l, m, n, p and q each is a positive integer)

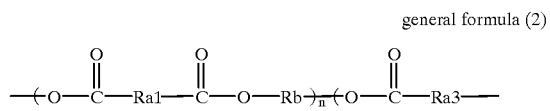

general formula (2)

-continued

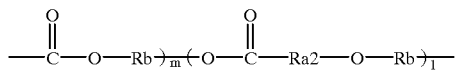

(wherein

Ra1 is an aromatic and/or aliphatic hydrocarbon group (derived from monomer (A1));

Ra2 is a hydrocarbon group (derived from monomer (A2));

Ra3 is an aliphatic hydrocarbon group having a C=C bond (derived from monomer (A3));

Rb is a hydrocarbon group (derived from monomer (B)); and l, m, and n each is a positive integer).

The present invention further provides:

(2) the thermoplastic polyester resin as described in (1) above wherein the proportion of the aromatic dicarboxylic acid and/or aliphatic dicarboxylic acid (A1) to the aliphatic hydroxycarboxylic acid (A2) is from 80/20 to 50/50 and the content of the aliphatic dicarboxylic acid having a carbon-carbon unsaturated bond in the molecule (A3) in the acid ingredient (A) is from 0.5 to 10% by mole;

(3) the thermoplastic polyester resin as described in (1) or (2) above wherein the dicarboxylic acid having a carbon-carbon unsaturated bond in the molecule (A3) is fumaric acid or maleic acid; and (4) the thermoplastic polyester resin as described in any one of (1) to (3) above which is represented by general formula (2) and is produced by polymerizing ingredients (A) and (B) by a method in which the ingredients are introduced into a reactor at a time, the polyester resin having a melt index MI (measured at 230° C. under a load of 2.16 kg) of from 1 to 50:

general formula (2)

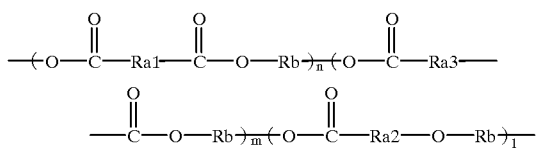

(wherein

Ra1 is an aromatic and/or aliphatic hydrocarbon group (derived from monomer (A1));

Ra2 is a hydrocarbon group (derived from monomer (A2));

Ra3 is an aliphatic hydrocarbon group having a C=C bond (derived from monomer (A3));

Rb is a hydrocarbon group (derived from monomer (B)); and l, m, and n each is a positive integer).

The present invention furthermore provides:

(5) an insulated wire which comprises a conductor covered with a coating layer formed from a resin composition mainly comprising the thermoplastic polyester resin as described in any one of (1) to (4) above, said thermoplastic polyester resin in the coating layer having been crosslinked;

(6) a high-strength, thinly insulated wire which comprises a conductor having an outer diameter of 1.0 mm or smaller covered with a coating layer having a thickness of from 0.1 to 0.5 mm formed from a resin composition mainly comprising the thermoplastic polyester resin as described in any one of (1) to (4) above, said thermoplastic polyester resin in the coating layer having been crosslinked;

(7) an electrically insulated cable comprising an insulated wire which has one or more cores and the periphery of which is covered with a coating layer formed from a resin composition mainly comprising the thermoplastic polyester resin as described in any one of (1) to (4) above, said thermoplastic polyester resin in the coating layer having been crosslinked; and (8) a heat-shrinkable tube produced by molding a resin composition mainly comprising the thermoplastic polyester resin as described in any one of (1) to (4) above into a tube, crosslinking the thermoplastic polyester resin constituting the tube, subsequently expanding the tube in the radial directions under heating conditions, and then cooling the tube to fix the expanded shape.

BRIEF DESCRIPTION OF THE DRAWINGS

In FIGS. 1 and 2, numeral 1 indicates an electric wire sample, numeral 2 indicates a sandpaper, numeral 3 indicates load, and numeral 4 indicates a steel wire.

Figure 1:
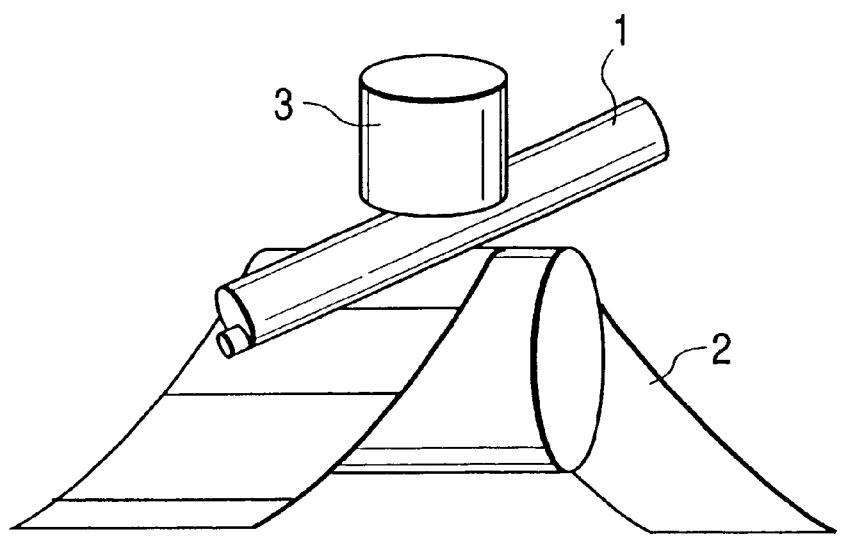
FIG. 1 is a diagrammatic view illustrating a tape abrasion test conventionally used for examining the abrasion resistance of electric wires.

DETAILED DESCRIPTION OF THE INVENTION (1) Thermoplastic Polyester Resin (i) Production Processes The thermoplastic polyester resin of the present invention can be easily produced by subjecting the acid ingredient (A) and diol ingredient (B) described below to polycondensation by a known means.

For example, the acid ingredient (A) comprises (A1) an aromatic dicarboxylic acid or a lower alkyl ester thereof, such as terephthalic acid or a lower alkyl ester thereof, isophthalic acid or a lower alkyl ester thereof, or naphthalenedicarboxylic acid or a lower alkyl ester thereof, and/or cyclohexanedicarboxylic acid or a lower alkyl ester thereof;

(A2) an aliphatic hydroxycarboxylic acid or a lower alkyl ester thereof; and (A3) an aliphatic dicarboxylic acid having a carbon-carbon double bond in the molecule, such as fumaric acid or maleic acid, or the anhydride thereof, and the diol ingredient (B) comprises an aliphatic diol such as 1,4-butanediol or 1,6-hexanediol. The term "lower alkyl" as used in the present specification means an alkyl group having 1 to 6 carbon atoms.

In one polycondensation process, such monomer ingredients are subjected to a transesterification reaction at an elevated temperature and a reduced pressure using a catalyst, e.g., an organotitanium compound such as n-butyl titanate, to obtain a prepolymer. Thereafter, an aliphatic hydroxycarboxylic acid, e.g., ε-caprolactone, is added to the prepolymer to conduct a transesterification reaction. Thus, a block copolymer type polyester resin represented by general formula (1) is obtained by the two-stage polymerization method. Other usable production processes include all monomers-charging method, i.e., direct polymerization method, in which all the monomer ingredients are introduced into a reactor at a time and polymerized through transesterification to obtain a random copolymer type polyester resin represented by general formula (2).

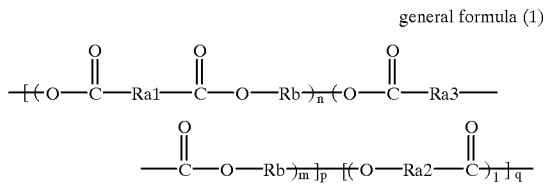

general formula (1)

(In formula (1),
Ra1 is an aromatic and/or aliphatic hydrocarbon group (derived from monomer (A1));
Ra2 is a hydrocarbon group (derived from monomer (A2));
Ra3 is an aliphatic hydrocarbon group having a C=C bond (derived from monomer (A3));
Rb is a hydrocarbon group (derived from monomer (B)); and
l, m, n, p and q each is a positive integer.)

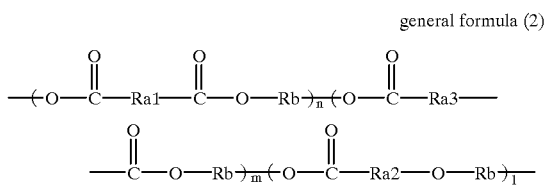

general formula (2)

(In formula (2),
Ra1 is an aromatic and/or aliphatic hydrocarbon group (derived from monomer (A1));
Ra2 is a hydrocarbon group (derived from monomer (A2));
Ra3 is an aliphatic hydrocarbon group having a C=C bond (derived from monomer (A3));
Rb is a hydrocarbon group (derived from monomer (B)); and
l, m, and n each is a positive integer.)

In producing the thermoplastic polyester resin of the present invention, use of the all monomers-charging method is preferred in that the resultant polyester resin represented by general formula (2), which is obtained as a random copolymer, is superior in thermal aging resistance to the thermoplastic polyester resins obtained by other methods.

(ii) Monomer Ingredients (A) Acid Ingredient (A1) Aromatic dicarboxylic acid or lower alkyl ester thereof and/or aliphatic dicarboxylic acid 1) Examples of ingredient (A1) include aromatic dicarboxylic acids such as terephthalic acid, dimethyl terephthalate, isophthalic acid, phthalic acid, 2,5-norbornanedicarboxylic acid, 1,4-naphthalic acid, 1,5-naphthalic acid, 4,4-hydroxybenzoic acid, diphenyldicarboxylic acid, naphthalenedicarboxylic acid, (diphenyl sulfone) dicarboxylic acid, and diphenoxyethanedicarboxylic acid and lower alkyl esters of such acids (e.g., dimethyl isophthalate and methyl isophthalate). Especially preferred are dimethyl terephthalate and dimethyl isophthalate.

2) Examples of ingredient (A1) further include aliphatic dicarboxylic acids such as succinic acid, adipic acid, sebacic acid, dodecanedicarboxylic acid, and dimer acids. Especially preferred is sebacic acid.

(A2) Aliphatic hydroxycarboxylic acid

Examples thereof include aliphatic hydroxycarboxylic acids such as ε-hydroxycaproic acid and ε-caprolactone. Especially preferred is ε-caprolactone. Polycaprolactone may be used.

(A3) Aliphatic dicarboxylic acid having carbon-carbon double bond in the molecule Examples thereof include fumaric acid, maleic acid, citraconic acid, mesaconic acid, and the anhydrides thereof. Especially preferred is fumaric acid.

(B) Diol Ingredient

As the diol ingredient is used one or more aliphatic diols.

Examples thereof include aliphatic linear diols such as ethylene glycol, 1,3-propylene glycol, 1,4-butanediol, 1,5-pentanediol, 1,6-hexanediol, 1,7-heptanediol, 1,8-octanediol, 1,9-nonanediol, and 1,10-dodecanediol. Especially preferred are 1,4-butanediol and 1,6-hexanediol.

(C) Composition of Acid Ingredient (A)

1) The proportions of the dicarboxylic acid ingredients (A1), (A2), and (A3) are as follows. The proportions of ingredients (A1) and (A2) exert great influence on the modulus of elasticity of the polyester resin to be obtained. From the standpoint of flexibility, the proportion of the saturated aliphatic hydroxycarboxylic acid (A2) is preferably large. However, too large proportions of ingredient (A2) result in a polyester resin which has considerably reduced crystallinity and hence has a problem of very poor extrudability.

Consequently, the molar proportion of (A1)/(A2) is preferably from 80/20 to 50/50. The more preferred range thereof is from 65/35 to 50/50, because it gives preferred results also with respect to the flexibility of the polyester resin to be obtained.

2) On the other hand, the proportion of ingredient (A3), which is an aliphatic dicarboxylic acid having a carbon-carbon unsaturated bond in the molecule, is such that the content thereof in the dicarboxylic acid ingredient (A) is preferably from 0.5 to 15% by mole, more preferably from 0.5 to 7% by mole.

If the proportion of (A3) is below 0.5%, the resultant polyester resin gives an insulator which, when controled so as to have a thickness reduced, e.g., to 0.5 mm or smaller, has insufficient thermal aging resistance. If the proportion thereof exceeds 10%, polymerization control is difficult.

3) In the case where ingredient (A1) comprises a mixture of terephthalic acid or a lower alkyl ester thereof with isophthalic acid or a lower alkyl ester thereof, larger values of the proportion of the isophthalic acid or its lower alkyl ester give preferred results concerning thermal aging resistance. However, too large proportions thereof result in a polyester resin which has considerably reduced crystallinity and hence has a problem of very poor extrudability. Consequently, the molar proportion of the terephthalic acid or its lower alkyl ester to the isophthalic acid or its lower alkyl ester is preferably from 100/0 to 50/50, more preferably from 100/0 to 60/40.

(iii) Properties of the Thermoplastic Polyester Resin

1) The thermoplastic polyester resin of the present invention should have the composition described above and have either a block copolymer type structure or a random copolymer type structure depending on the polymerization method used. In addition, it should have a melt index MI (measured at 230° C. under a load of 2.16 kg according to JIS K 7210) of from 1 to 50, preferably from 1 to 20.

If the MI of the resin is lower than 1, the resin has reduced extrudability. Values of the MI thereof exceeding 50 also result in reduced extrudability.

The thermoplastic polyester resin desirably has a melting point as measured with a differential scanning calorimeter (DSC) of from 100 to 200° C.

The thermoplastic polyester resin generally has a molecular weight of 5,000 to 100,000, preferably from 10,000 to 50,000.

2) The thermoplastic polyester resin of the present invention not only exhibits excellent elastomer performances due to its chemical structure, but also comes to have a tenacious crosslinked structure through irradiation with a radiation because the backbone thereof has unsaturated groups. The crosslinked resin is excellent not only in flexibility, thermal aging resistance, and abrasion resistance but in electrical insulating properties. The thermoplastic polyester resin is hence a novel polyester resin useful in a wide range of applications including insulated wires, insulated cables, and heat-shrinkable tubes.

3) The thermoplastic polyester resin of the present invention can be used in various applications in the form of a resin composition which comprises the polyester resin as the main component, one or more other thermoplastic polyester elastomers and other various additive ingredients, etc. as optional ingredients.

(II) Various Additive Ingredients (1) Flame-Retardant Formulation

Because the thermoplastic polyester resin described above is combustible, it should be flameproofed for application to automotive electric wires, etc.

1) A usable means for flameproofing is to incorporate a flame retardant. Examples of the retardant include halogen compound flame retardants such as polybromodiphenyl ether, ethylenebisbromophthalimide, bis(bromophenyl) ethane, bis(bromophenyl)terephthalamide, and perchloropentacyclodecane; nitrogen compound flame retardants such as melamine cyanurate; and inorganic flame retardants such as antimony trioxide, aluminum hydroxide, magnesium hydroxide, and calcium hydroxide.

Preferred among those flame retardants are ethylenebisbromophthalimide, bis(bromophenyl)ethane, and bis (bromophenyl) terephthalamide, because these flame retardants neither impair the thermal aging resistance of the thermoplastic polyester resin nor pose problems such as flame retardant bleeding on insulator surfaces.

2) The incorporation amount of such a flame retardant varies depending on the kind thereof and on the required degree of flameproofing. For example, in the case of a halogen compound flame retardant, it may be incorporated in an amount of from 5 to 50 parts by weight, preferably from 10 to 30 parts by weight, per 100 parts by weight of the thermoplastic polyester resin.

In the above case, more effective flameproofing is possible when the halogen compound flame retardant is used in combination with an appropriate amount of antimony trioxide.

2) Other Additives

Besides a flame retardant, other known additives can be suitably incorporated into the thermoplastic polyester elastomer according to need. Examples of such other additives include antioxidants, ultraviolet absorbers, nucleating agents (e.g., alkali metal compounds and talc), lubricants, colorants, processing aids, foaming agents, polyfunctional monomers, hydrolysis inhibitors, and polymerization inhibitors. The total amount of these additives is generally from 1 to 50 parts by weight per 100 parts by weight of the thermoplastic polyester resin.

As an antioxidant for heat resistance and thermal aging resistance, the use of amine or hindered phenol antioxidants is especially preferred.

The polyfunctional monomers, which function as a crosslinking aid, may be added for the purpose of heightening the crosslinking efficiency especially during irradiation with an ionizing radiation. Examples thereof include 1,6-hexanediol dimethacrylate, trimethylolpropane trimethacrylate, pentamethylolpropane triacrylate, ethylene glycol dimethacrylate, triallyl cyanurate, and triallyl isocyanurate.

The thermoplastic polyester resin of the present invention brings about the following effects.

(i) The thermoplastic polyester resin according to the present invention can be applied on a conductor by the melt extrusion coating method like conventional polyester elastomers, and the applied resin can be crosslinked by irradiating the coating layer with accelerated electron beams. Thus, a highly flexible insulated wire can be obtained which is excellent in abrasion resistance and thermal aging resistance even when the insulator thickness has been reduced to 0.5 mm or smaller.

(ii) When the polyester resin is used as a material for the sheath covering the periphery of an insulated wire having one or more cores, an electrically insulated cable can be obtained which is excellent in flexibility, abrasion resistance, and thermal aging resistance.

(iii) The polyester resin can be formed also into a flexible heat-shrinkable tube excellent in abrasion resistance and thermal aging resistance by molding the resin into a tube by melt forming, etc., irradiating the tube with accelerated electron beams, etc. to crosslink the resin, expanding the tube in the radial directions (i.e., the directions perpendicular to the axis of the tube) at a temperature not lower than the melting point thereof, for example, by introducing compressed air thereinto, and then cooling the tube to fix the expanded shape.

(III) Various Molded Objects and Production thereof (i) Production of Insulated Wire, High-Strength Thinly Insulated Wire, and Insulated Cable 1) A resin composition mainly comprising the thermoplastic polyester resin of the present invention is applied on a conductor by extrusion coating with an extruder or the like, and the coating layer is irradiated with accelerated electron beams to crosslink the resin. Thus, a highly flexible insulated wire is provided which is excellent in abrasion resistance and thermal aging resistance even when the insulator thickness is small.

2) The periphery of an insulated wire having one or more cores is extrusion-coated with a resin composition mainly comprising the thermoplastic polyester resin, and the coating layer is irradiated with accelerated electron beams to crosslink the resin. Thus, an electrically insulated cable is provided which has the same properties as the above insulated wire.

3) The thermoplastic polyester resin of the present invention is excellent in abrasion resistance and thermal aging resistance even when applied in a reduced thickness. The resin can hence be applied to a conductor having an outer diameter of 1.0 mm or smaller in a thickness of from 0.1 to 0.5 mm. Thus, a high-strength thinly insulated wire is provided.

If the insulator thickness is smaller than 0.1 mm, the insulator layer is too thin to withstand practical use at ordinary withstand voltages. If the insulator thickness exceeds 1.0 mm, the wiring process in a small space becomes to be difficult.

This high-strength thinly insulated wire can be easily made to be flame-retardant. The flame-retardant wire is suitable for use as an insulated wire for instrument wiring which meets safety standards including various UL ratings. This flame-retardant insulated wire has an advantage that it is pollution-free while securing safety such as fire prevention.

(ii) Production of Heat-Shrinkable Tube

A resin composition mainly comprising the thermoplastic polyester resin of the present invention is molded into a tube by melt extrusion or another technique. The tube is irradiated with accelerated electron beams to crosslink the resin, subsequently expanded in the radial directions under heating conditions, and then cooled to fix the expanded shape. Thus, a flexible heat-shrinkable tube excellent in abrasion resistance and thermal aging resistance is produced.

The present invention will be explained below in more detail by reference to Examples, but the invention should not be construed as being limited thereto.

(iii) Crosslinkable Formulation

1) Examples of the ionizing radiation include electron beams, accelerated electron beams, γ-rays, X-rays, α-rays, and ultraviolet. However, the most preferred of these are accelerated electron beams from the standpoints of industrial utilization, such as the simplicity of the radiation source, the thickness through which the ionizing radiation penetrates, and the rate of crosslinking treatment.

In the case of electron beams, for example, the irradiation dose of the ionizing radiation can be from 3 to 50 Mrad, preferably from 5 to 25 Mrad.

If the irradiation dose is smaller than 3 Mrad, the effect of improving abrasion resistance, heat resistance, thermal aging resistance, and tensile strength is insufficient. If the irradiation dose exceeds 50 Mrad, thermal aging resistance is impaired rather than improved.

2) In place of irradiation with an ionizing radiation, chemical crosslinking can be employed. The chemical crosslinking can be accomplished by incorporating an organic peroxide or the like into the resin composition beforehand, molding the composition, and then heating the molded object.

Examples of the organic peroxide include dicumyl peroxide and bis(t-butylperoxyisopropyl) peroxide.

However, irradiation with an ionizing radiation is preferred from the standpoints of the efficiency and rate of crosslinking, etc.

Evaluation Methods (i) Modulus of Elasticity: The tensile test provided for in JIS C3005 was conducted to determine modulus in tension.

Figure 2:
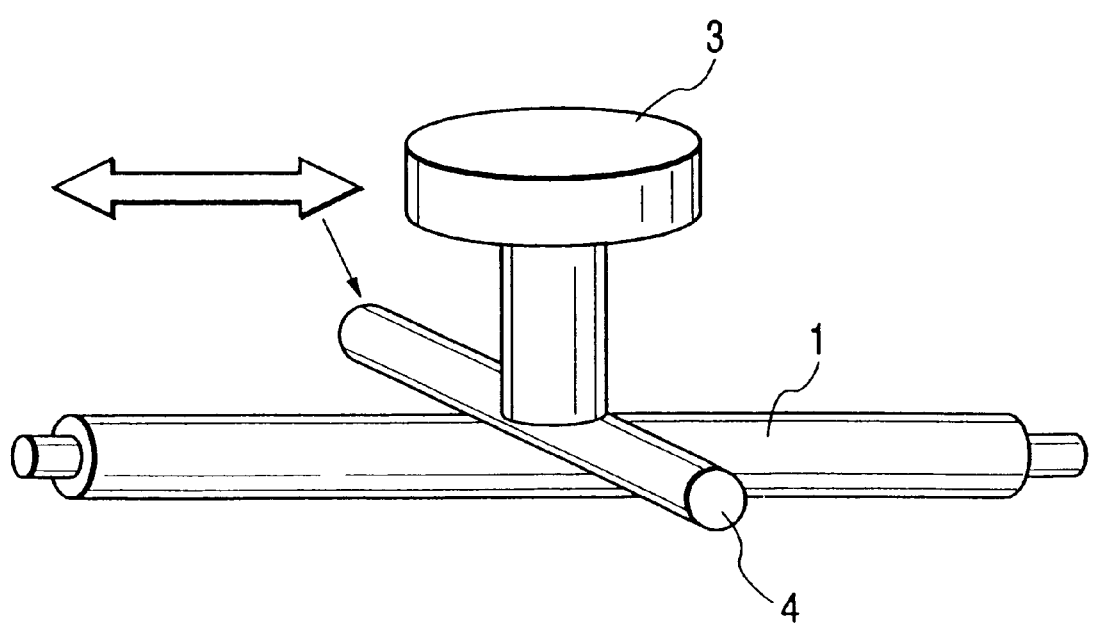
FIG. 2 is a diagrammatic view illustrating the scrape abrasion test used in the present invention for examining the abrasion resistance of electric wires.

(ii) Abrasion Resistance: The scrape abrasion test illustrated in FIG. 2 was conducted.

In this abrasion test, a load 3 of 714 g is imposed on a steel bar 4 having an outer diameter of 0.45 mm. This steel bar is reciprocated on an electric wire sample 1 to scrape the sample, and the number of reciprocations required for the steel bar 4 to come into electrical contact with the conductor of the insulated wire is determined. Five electric wire samples are thus tested, and the average of the five numbers of reciprocations required for the abrasion is shown.

In this test method, the electric wires having an abrasion resistance of 300 reciprocations or higher are regarded as acceptable (○).

(iii) Volume Resistivity: Measurement was made according to the JIS C3005 method under the conditions of a DC of 500 V.

(iv) Thermal Aging Resistance: Insulator samples having thicknesses of 0.20 mm and 0.5 mm, respectively, and having a length of 200 mm are examined by the Arrhenius method to determine the temperature rating for 10,000-hour aging.

Figure 3:
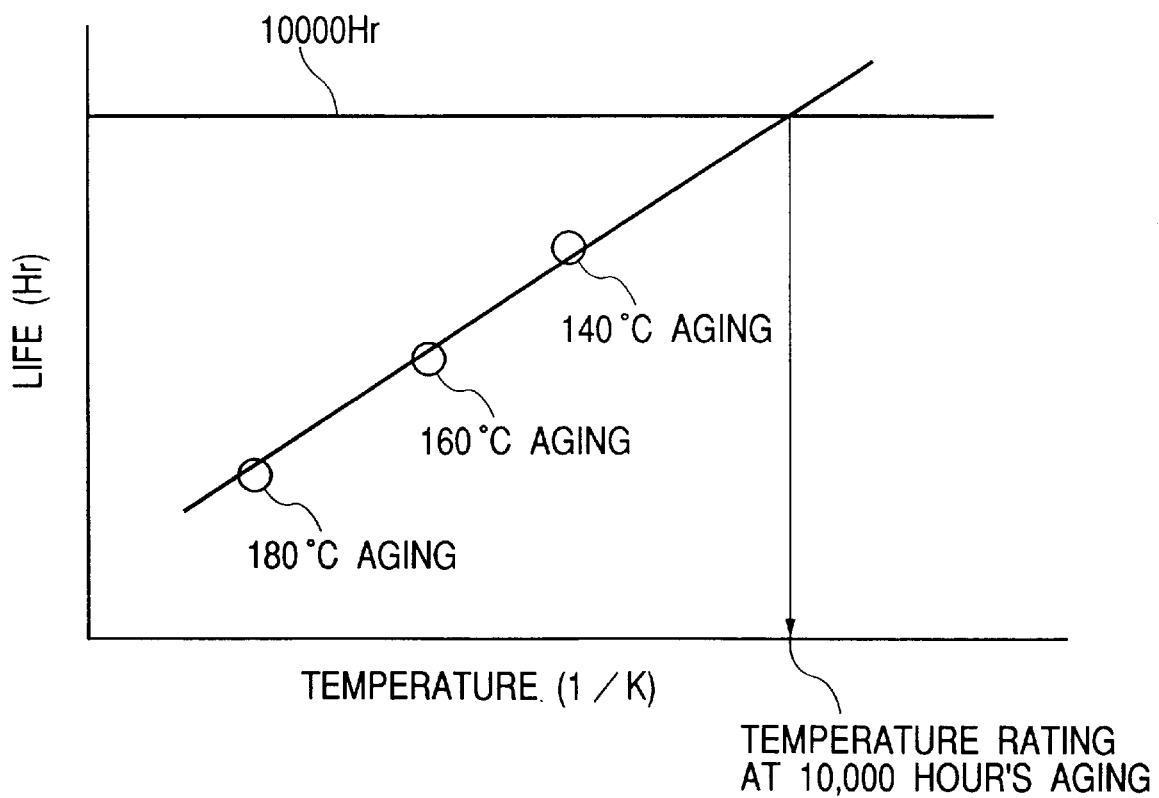
FIG. 3 is a graph illustrating the Arrhenius method used for a thermal aging resistance test for electric wires.

The Arrhenius method is conducted in the following manner. The insulator samples are hung in three Geer ovens respectively controled so as to have temperatures of, for example, 140, 160, and 180° C., and the time period required for each insulator sample to have an elongation reduced to 50% is measured. The results concerning the lives at the three temperatures are plotted, with temperature (1/K) as abscissa and life (Hr) as ordinate, as shown in FIG. 3. The temperature rating at which the aging time is 10,000 hours is estimated by linear extrapolation.

In this evaluation, the insulators having a thermal aging resistance of 125° C. in terms of temperature rating are regarded as acceptable (○).

(v) Combustion Test with Inclination: This test was conducted in accordance with ISO 6722 in the following manner. Electric wire samples of 0.2 mm$\phi$ and 0.5 mm$\phi$, respectively, are set inclined at an angle of 45°. A burner flame is applied to each sample for 10 seconds, and the time required for the resultant fire to go out is measured. The electric wires in which the fire goes out in 70 seconds are regarded as acceptable (○).

EXAMPLE 1

Production of Insulated Wire

Into a reactor were introduced (A1) dimethyl terephthalate and dimethyl isophthalate, (A2) ε-caprolactone, (A3) dimethyl fumarate, and (B) 1,4-butanediol at a time in a proportion of 3.5/2.2/4.0/0.4/10.0 by mole. n-Butyl titanate (catalyst) was added thereto in an amount of 1,000 ppm to conduct transesterification reaction at 160 to 240° C. in a nitrogen gas atmosphere. The resultant methanol was distilled off, which amounted to 98% of the theoretical amount. Thereafter, n-butyl titanate (catalyst) was further added in an amount of 150 ppm to conduct polycondensation reaction at 240 to 260° C. for 3 hours at a reduced pressure of 0.1 Torr. A phosphorus compound (Irganox 1222, trade name, manufactured by Ciba-Geigy Ltd.) as a deactivator for the titanium catalyst was added to the reaction mixture in an amount of 600 ppm. The resultant mixture was discharged from the reactor to obtain a polyester resin having a melting point of 136° C., an MI of 24 (as measured at 190° C. under a load of 5 kg) and an MI of 21 (as measured at 230° C. under a load of 2.16 kg).

A hundred parts by weight of the polyester resin was premixed with 10 parts by weight of bis (pentabromophenyl) ethane, 5 parts by weight of antimony trioxide, 1 part by weight of a hindered phenol antioxidant (Irganox 1010, trade name, manufactured by Ciba-Geigy Ltd.), and 5 parts by weight of trimethylolpropane triacrylate with a Henschel mixer. This mixture was melt-kneaded with a twin-screw extruder (45 mm$\phi$; L/D=42), and strands of the melt were cooled and pelletized.

These pellets were melt-extruded over a stranded conductor (outer diameter, 0.80 mm) composed of nineteen, tinplated, annealed copper wires each having a diameter of 0.16 mm by means of an extruder (30 mm$\phi$; L/D=24) to thereby provide coats having a thickness of 0.20 mm and 0.5 mm. The coating layers were irradiated with electron beams at an accelerating voltage of 1 MeV in a dose of 200 kGy to crosslink the resin in the coating layers. Thus, insulated wires were obtained.

These insulated wires were evaluated, and the results obtained are shown in Table 3. The insulator had excellent flexibility with a modulus of elasticity of 950 kg/cm$^2$. It further had excellent abrasion resistance. Specifically, the number of reciprocations for 0.2 mm insulator thickness was 360 as an average for five samples and that for 0.5 mm insulator thickness was 2,400; the abrasion resistance thereof thus met the required value of at least 300. With respect to thermal aging resistance, even the insulator having a thickness of 0.2 mm had a temperature rating for 10,000-hour aging of 152° C., showing that the insulated wires had excellent thermal aging resistance which met the temperature rating of 150° C.

The insulator was found to have sufficient electrical insulating properties with a volume resistivity on the order of $10^{14}$ Ωcm.

Furthermore, the combustion test with 45° inclination provided for in ISO 6722 was conducted. As a result, the insulated wires having an insulator thickness of 0.5 mm and 0.2 mm had a burning time of 6 seconds and 1 second, respectively. Thus, the insulated wires each was found to sufficiently meet the requirement that the fire should go out in 70 seconds.

EXAMPLE 2

A polyester resin was produced by the following two-stage polymerization method. n-Butyl titanate (catalyst) was added in an amount of 1,000 ppm to a monomer mixture composed of (A1) dimethyl terephthalate and dimethyl isophthalate, (A3) dimethyl fumarate, and (B) 1,4-butanediol in a proportion of 4.7/1.3/0.3/10.0 by mole to conduct transesterification reaction at 160 to 240° C. in a nitrogen gas atmosphere. The resultant methanol was distilled off, which amounted to 98% of the theoretical amount. Thereafter, n-butyl titanate (catalyst) was further added in an amount of 150 ppm to conduct polycondensation reaction at 240 to 260° C. for 3 hours at a reduced pressure of 0.1 Torr to obtain a prepolymer. A phosphorus compound (Irganox 1222, trade name, manufactured by Ciba-Geigy Ltd.) as a deactivator for the titanium catalyst was added to the reaction mixture in an amount of 600 ppm. Subsequently, (A2) ε-caprolactone was added to the prepolymer in a proportion of 4.0 by mole to further react the mixture at ordinary pressure and 260° C. for 4 hours. The polyester resin thus obtained had a melting point of 176° C., an MI of 18 (as measured at 190° C. under a load of 5 kg) and an MI of 16 (as measured at 230° C. under a load of 2.16 kg).

Extrusion coating was conducted by the same method as in Example 1 and the coating layers were irradiated with electron beams at an accelerating voltage of 1 MeV in a dose of 200 kGy to crosslink the resin in the coating layers. Thus, insulated wires were obtained.

These insulated wires were evaluated, and the results obtained are shown in Table 3. The insulator had excellent flexibility with a modulus of elasticity of 1,600 kg/cm². It further had excellent abrasion resistance. Specifically, the number of reciprocations for 0.2 mm insulator thickness was 580 and that for 0.5 mm insulator thickness was 1,800; the abrasion resistance thereof thus met the required value of at least 300. With respect to thermal aging resistance, even the insulator having a thickness of 0.2 mm had a temperature rating for 10,000-hour aging of 125° C., showing that the insulated wires had thermal aging resistance which met the temperature rating of 125° C.

The insulator had slightly insufficient electrical insulating properties with a volume resistivity on the order of $10^{12}$ Ωcm.

Furthermore, the combustion test with 45° inclination provided for in ISO 6722 was conducted. As a result, the insulated wires respectively having insulator thicknesses of 0.5 mm and 0.2 mm had burning times of 4 seconds and 1 second, respectively. Thus, the insulated wires each was found to sufficiently meet the requirement that the fire should go out in 70 seconds.

EXAMPLE 3

Into a reactor were introduced (A1) dimethyl terephthalate and dimethyl isophthalate, (A2) ε-caprolactone, (A3) dimethyl fumarate, and (B) 1,4-butanediol at a time in a proportion of 4.7/1.3/4.0/0.3/10.0 by mole. n-Butyl titanate (catalyst) was added thereto in an amount of 1,000 ppm to conduct transesterification reaction at 160 to 240° C. in a nitrogen gas atmosphere. The resultant methanol was distilled off, which amounted to 98% of the theoretical amount. Thereafter, n-butyl titanate (catalyst) was further added in an amount of 150 ppm to conduct polycondensation reaction at 240 to 260° C. for 3 hours at a reduced pressure of 0.1 Torr. A phosphorus compound (Irganox 1222, trade name, manufactured by Ciba-Geigy Ltd.) as a deactivator for the titanium catalyst was added to the reaction mixture in an amount of 600 ppm. The resultant mixture was discharged from the reactor to obtain a polyester resin having a melting point of 150° C., an MI of 9 (as measured at 190° C. under a load of 5 kg) and an MI of 5 (as measured at 230° C. under a load of 2.16 kg).

The evaluation results obtained are shown in Table3. The insulator had excellent flexibility with a modulus of elasticity of 1,300 kg/cm². It further had excellent abrasion resistance. Specifically, the number of reciprocations for 0.2 mm insulator thickness was 440 and that for 0.5 mm insulator thickness was 1,700; the abrasion resistance thereof thus met the required value of at least 300. With respect to thermal aging resistance, even the insulator having a thickness of 0.2 mm had a temperature rating for 10,000-hour aging of 130° C., showing that the insulated wires had thermal aging resistance which met the temperature rating of 125° C.

The insulator was found to have sufficient electrical insulating properties with a volume resistivity on the order of $10^{13}$ Ωcm. Furthermore, the combustion test with 45° inclination provided for in ISO 6722 was conducted. As a result, the insulated wires having an insulator thickness of 0.5 mm and 0.2 mm had a burning time of 3 seconds and 2 seconds, respectively. Thus, the insulated wires each was found to sufficiently meet the requirement that the fire should go out in 70 seconds.

EXAMPLE 4

Into a reactor were introduced (A1) dimethyl terephthalate, (A2) ε-caprolactone, (A3) dimethyl fumarate, and (B) 1,4-butanediol at a time in a proportion of 6.0/4.0/0.3/10.0 by mole. n-Butyl titanate (catalyst) was added thereto in an amount of 1,000 ppm to conduct transesterification reaction at 160 to 240° C. in a nitrogen gas atmosphere. The resultant methanol was distilled off, which amounted to 98% of the theoretical amount. Thereafter, n-butyl titanate (catalyst) was further added in an amount of 150 ppm to conduct polycondensation reaction at 240 to 260° C. for 3 hours at a reduced pressure of 0.1 Torr. A phosphorus compound (Irganox 1222, trade name, manufactured by Ciba-Geigy Ltd.) as a deactivator for the titanium catalyst was added to the reaction mixture in an amount of 600 ppm. The resultant mixture was discharged from the reactor to obtain a polyester resin having a melting point of 150° C., an MI of 9 (as measured at 190° C. under a load of 5 kg), and an MI of 8 (as measured at 230° C. under a load of 2.16 kg).

The evaluation results obtained are shown in Table 3. The insulator had excellent flexibility with a modulus of elasticity of 1,700 kg/cm². It further had excellent abrasion resistance. Specifically, the number of reciprocations for 0.2 mm insulator thickness was 520 and that for 0.5 mm insulator thickness was 2,200; the abrasion resistance thereof thus met the required value of at least 300. With respect to thermal aging resistance, even the insulator having a thickness of 0.2 mm had a temperature rating for 10,000-hour aging of 126° C., showing that the insulated wires had thermal aging resistance which met the temperature rating of 125° C.

The insulator was found to have sufficient electrical insulating properties with a volume resistivity on the order of $10^{13}$ Ωcm. Furthermore, the combustion test with 45° inclination provided for in ISO 6722 was conducted. As a result, the insulated wires having an insulator thickness of 0.5 mm and 0.2 mm had a burning time of 5 seconds and 1 second, respectively. Thus, the insulated wires each was found to sufficiently meet the requirement that the fire should be extinguished in 70 seconds.

240 to 260° C. for 4 hours at a reduced pressure of 0.1 Torr to obtain a prepolymer. A phosphorus compound (Irganox 1222, trade name, manufactured by Ciba-Geigy Ltd.) as a deactivator for the titanium catalyst was added to the reaction mixture in an amount of 600 ppm. Subsequently, (A2) ε-caprolactone was added to the prepolymer in a proportion of 4.0 by mole to further react the mixture at ordinary pressure and 260° C. for 4 hours. The polyester resin thus obtained had a melting point of 203° C.

Extrusion coating was conducted by the same method as in Example 1 and the coating layers were irradiated with electron beams at an accelerating voltage of 1 MeV in a dose of 200 kGy to crosslink the resin in the coating layers. Thus, insulated wires were obtained.

The evaluation results obtained are shown in Table 4. The insulator had excellent flexibility with a modulus of elasticity of 1,500 kg/cm². With respect to abrasion resistance, however, the number of reciprocations for 0.2 mm insulator thickness was 18 and that for 0.5 mm insulator thickness was160. The insulated wires were thus found to have poor abrasion resistance which did not meet the required value of at least 300.

TABLE 3

|  | Example 1 | | Example 2 | | Example 3 | | Example 4 | |
| --- | --- | --- | --- | --- | --- | --- | --- | --- |
| Dimethyl terephthalate | 3.5 | | 4.7 | | 4.7 | | 6.0 | |
| Dimethyl isophthalate | 2.2 | | 1.3 | | 1.3 | | | |
| ε-Caprolactone | 4.0 | | 4.0 | | 4.0 | | 3.7 | |
| Dimethyl fumarate | 0.4 | | 0.3 | | 0.3 | | 0.3 | |
| 1,4-Butanediol | 10 | | 10 | | 10 | | 10 | |
| Polymerization method | All Monomers-Charging Method | | Two-stage Polymerization | | All Monomers-Charging Method | | All Monomers-Charging Method | |
| Melting point (° C.) | 121 | | 176 | | 150 | | 182 | |
| Modulus of elasticity(kg/cm²) | 950 | | 1600 | | 1300 | | 1700 | |
| Thickness of insulator (mm) | 0.2 | 0.5 | 0.2 | 0.5 | 0.2 | 0.5 | 0.2 | 0.5 |
| Abrasion resistance (number of reciprocations) | 360 | 2400 | 580 | 1800 | 440 | 1700 | 520 | 2200 |
| Thermal 200° C. aging life (hr) | 500 | — | 260 | — | 390 | — | 530 | — |
| 180° C. | 1700 | — | 630 | — | 910 | — | 1100 | — |
| 160° C. | 5500 | — | 1600 | — | 2200 | — | 3700 | — |
| Temperature rating for 10,000-hr aging (° C.) | 152 | — | 125 | — | 130 | — | 128 | — |
| Volume resistivity of insulator (Ωcm) | | 1.7 E + 14 | | 3.7 E + 12 | | 6.3 E + 13 | | 5.6 E + 13 |
| Combustion test with 45° Inclination (sec) | 1 | 6 | 1 | 4 | 2 | 3 | 1 | 5 |

COMPARATIVE EXAMPLE 1

A polyester resin was produced by the following two-stage polymerization method. n-Butyl titanate (catalyst) was added in an amount of 1,000 ppm to a monomer mixture composed of (A1) dimethyl terephthalate and (B) 1,4-butanediol in a proportion of 6.0/10.0 by mole to conduct transesterification reaction at 160 to 240° C. in a nitrogen gas atmosphere. The resultant methanol was distilled off, which amounted to 98% of the theoretical amount. Thereafter, n-butyl titanate (catalyst) was further added in an amount of 150 ppm to conduct polycondensation reaction at The insulator had slightly insufficient electrical insulating properties with a volume resistivity on the order of $10^{12}$ Ωcm.

COMPARATIVE EXAMPLE 2

A polyester resin having a melting point of 216° C. was obtained by the same two-stage polymerization method as in Comparative Example 1, except that a prepolymer was obtained by polymerizing a monomer mixture composed of (A1) dimethyl terephthalate and (B) 1,4-butanediol in a proportion of 8.5/10.0 by mole, and that (A2) ε-caprolactone was added to the prepolymer in a proportion of 1.5 by mole to further react the mixture at ordinary pressure and 260° C. for 4 hours. Extrusion coating was conducted by the same method as in the Examples and the coating layers were irradiated with electron beams at an accelerating voltage of 1 MeV in a dose of 200 kGy to crosslink the resin in the coating layers. Thus, insulated wires were obtained.

The evaluation results obtained are shown in Table 4. The insulator had poor flexibility with a modulus of elasticity of 6,400 kg/cm². With respect to abrasion resistance also, the number of reciprocations for 0.2 mm insulator thickness was 240. The insulated wire was thus found to have poor abrasion resistance which did not meet the required value of at least 300.

TABLE 4

| | Comparative Example 1 | | Comparative Example 2 | |
|---|---|---|---|---|
| Dimethyl terephthalate | 6.0 | | 8.5 | |
| Dimethyl isophthalate | | | | |
| ε-Caprolactone | 4.0 | | 1.5 | |
| Dimethyl fumarate | | | | |
| 1,4-Butanediol | 10 | | 10 | |
| Polymerization method | two-stage polymerization | | two-stage polymerization | |
| Melting point (° C.) | 203 | | 216 | |
| Modulus of elasticity(kg/cm²) | 1500 | | 6400 | |
| Thickness of insulator (mm) | 0.2 | 0.5 | 0.2 | 0.5 |
| Abrasion resistance (number of reciprocations) | 18 | 160 | 240 | 1600 |
| Thermal aging life (hr) 200° C. | 250 | — | — | — |
| 180° C. | 720 | — | — | — |
| 160° C. | 1800 | — | — | — |
| Temperature rating for 10,000-hr aging (° C.) | 129 | — | — | — |
| Volume resistivity of insulator (Ωcm) | | 2.5 E + 12 | | 3.7 E + 13 |
| Combustion test with 45° inclination (sec) | 1 | 3 | — | — |

As demonstrated above, use of the polyester resin of the present invention produces the peculiar effect that an insulated wire is obtained which not only has excellent flexibility but is excellent in abrasion resistance, thermal aging resistance, flame retardancy, and other properties even when the insulator thickness has been reduced to 0.5 mm or smaller.

Example of Electrically Insulated Cable

EXAMPLE 5

The periphery of a strand wire obtained by twisting two insulated wires each containing a copper alloy conductor 3/20/0.08 and having an insulator outer diameter of 1.7 mm (Irax B8, trade name, manufactured by Sumitomo Electric Industries, Ltd.) at a pitch of 35 mm was coated, by coextrusion with an extruder, with a resin composition mainly comprising an ethylene/vinyl acetate copolymer (vinyl acetate content, 20 wt %, melt flow rate, 5) so as to give a filler layer having an outer diameter of 4.0 mm and with the polyester resin composition of Example 2 so as to give a sheath layer having an outer diameter of 5.0 mm. The coated wire was irradiated with electron beams at an accelerating voltage of 1 MeV in a dose of 250 kGy. Thus, an electrically insulated cable was obtained.

This electrically insulated cable had excellent flexibility. The sheath layer was evaluated for abrasion resistance in the same manner as in Example 1 to determine the number of reciprocations for abrasion required for the filler layer to be exposed in visual examination. As a result, the number of reciprocations for abrasion, as an average for five samples, was 4,300, showing that the cable had exceedingly high abrasion resistance.

Furthermore, the flame retardancy of the cable was evaluated through the combustion test with 45° inclination. As a result, the cable had a burning time of 2 seconds as an average for five samples, showing that it had excellent flame retardancy.

Example of Heat-Shrinkable Tube

EXAMPLE 6

The polyester resin of Example 1 was molded with an extruder (40 mmφ; L/D=24) into a tube having an inner diameter of 5.0 mm and a wall thickness of 0.8 mm. This tube was irradiated with electron beams at an accelerating voltage of 1 MeV in a dose of 150 kGy.

One end of the tube was sealed and the other was connected to a piping for introducing compressed air. The tube in this state was inserted into a tetrafluoroethylene resin pipe having an inner diameter of 15 mm, wall thickness of 2.0 mm, and length of 1 m. Thereafter, the tube together with the tetrafluoroethylene resin pipe was preheated in a 150° C. thermostatic chamber for 3 minutes.

After the preheating, compressed air was introduced into the tube to expand the same until it conformed to the inner surface of the pipe. Subsequently, the tube in contact with the pipe was taken out of the thermostatic chamber while maintaining the air-expanded state and then cooled with water to fix the expanded shape. Thus, a heat-shrinkable tube was obtained.

A copper pipe having an outer diameter of 10 mm was enveloped in the heat-shrinkable tube, placed in a 150° C. thermostatic chamber for 3 minutes, and then taken out therefrom. As a result, the tube was found to have thermally shrunk so as to fit the copper pipe.

Samples of this thermally shrunk tube were subjected to the same abrasion resistance test as in Example 1. As a result, the number of reciprocations for abrasion, as an average for five samples, was 4,700, showing that the tube had excellent abrasion resistance.

Samples of the tube which had been thermally shrunk and was in close contact with the copper pipe were further subjected to the combustion test with 45° inclination. As a result, the tube had a burning time of 1 second as an average for five samples, showing that it was excellent also in flame retardancy.

Furthermore, the crosslinked tube which had not been expanded was subjected to the same thermal aging test as in Example 1 in 160, 180, and 200° C. thermostatic chambers to estimate the temperature rating for 10,000-hour aging. As a result, the rating was found to be 176° C., showing that the tube had exceedingly high heat resistance.

As described above, a polyester resin composition excellent in flexibility, flame retardancy, and thermal aging resistance is obtained according to the present invention. When the composition is used as a coating material in producing insulated wires, a thinly insulated wire is obtained which not only has excellent abrasion resistance even when the coating layer thickness has been reduced to 0.5 mm or smaller, but satisfies a high degree of thermal aging resistance such as a temperature rating of 125° C. or 150° C. In addition, an electrically insulated cable and a heat-shrinkable tube both excellent in flexibility, abrasion resistance, flame retardancy, and thermal aging resistance are obtained from the composition. Therefore, the thermoplastic polyester resin of the present invention is highly useful in the field of automotive harnesses, etc.

While the invention has been described in detail and with reference to specific embodiments thereof, it will be apparent to one skilled in the art that various changes and modifications can be made therein without departing from the spirit and scope thereof.

What is claimed is:

1. A thermoplastic polyester resin represented by general formula (1) or (2) which comprises monomer units derived from an acid ingredient (A) comprising (A1) an aromatic dicarboxylic acid and/or an aliphatic dicarboxylic acid, (A2) an aliphatic hydroxycarboxylic acid, and (A3) an aliphatic dicarboxylic acid having a carbon-carbon unsaturated bond in the molecule and monomer units derived from a glycol ingredient (B) comprising an aliphatic diol, said thermoplastic polyester resin having a melt index MI (measured at 230° C. under a load of 2.16 kg) of from 1 to 50:

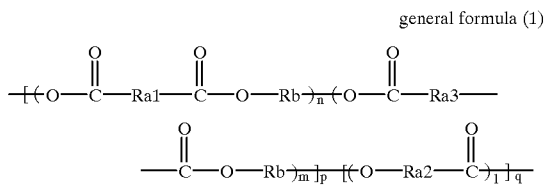

general formula (1)

wherein

Ra1 is an aromatic and/or aliphatic hydrocarbon group (derived from monomer (A1));

Ra2 is a hydrocarbon group (derived from monomer (A2));

Ra3 is an aliphatic hydrocarbon group having a C=C bond (derived from monomer (A3));

Rb is a hydrocarbon group (derived from monomer (B)); and l, m, n, p and q each is a positive integer;

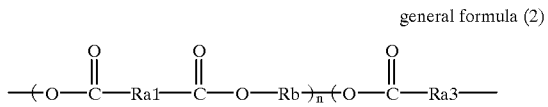

general formula (2)

-continued

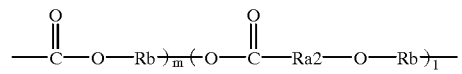

wherein

Ra1 is an aromatic and/or aliphatic hydrocarbon group (derived from monomer (A1));

Ra2 is a hydrocarbon group (derived from monomer (A2));

Ra3 is an aliphatic hydrocarbon group having a C=C bond (derived from monomer (A3));

Rb is a hydrocarbon group (derived from monomer (B)); and l, m, and n each is a positive integer.

2. The thermoplastic polyester resin of claim 1, wherein the proportion of the aromatic dicarboxylic acid and/or aliphatic dicarboxylic acid (A1) to the aliphatic hydroxycarboxylic acid (A2) is from 80/20 to 50/50 and the content of the aliphatic dicarboxylic acid having a carbon-carbon unsaturated bond in the molecule (A3) in the acid ingredient (A) is from 0.5 to 10% by mole.

3. The thermoplastic polyester resin of claim 1, wherein the dicarboxylic acid having a carbon-carbon unsaturated bond in the molecule (A3) is fumaric acid or maleic acid.

4. The thermoplastic polyester resin of claim 1, which is represented by general formula (2) and is produced by polymerizing ingredients (A) and (B) by a method in which the ingredients are introduced into a reactor at a time, the polyester resin having a melt index MI (measured at 230° C. under a load of 2.16 kg) of from 1 to 50:

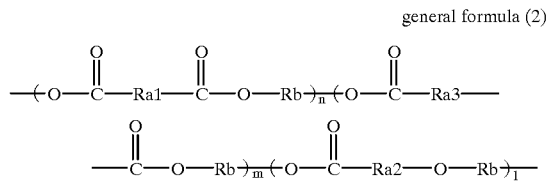

general formula (2)

wherein

Ra1 is an aromatic and/or aliphatic hydrocarbon group (derived from monomer (A1));

Ra2 is a hydrocarbon group (derived from monomer (A2));

Ra3 is an aliphatic hydrocarbon group having a C=C bond (derived from monomer (A3));

Rb is a hydrocarbon group (derived from monomer (B)); and l, m, and n each is a positive integer.

5. An insulated wire which comprises a conductor covered with a coating layer formed from a resin composition mainly comprising a thermoplastic polyester resin which is represented by general formula (1) or (2) and has a melt index MI (measured at 230° C. under a load of 2.16 kg) of from 1 to 50, said thermoplastic polyester resin in the coating layer having been crosslinked:

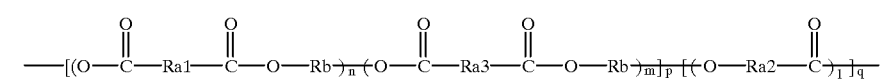

general formula (1)

-continued

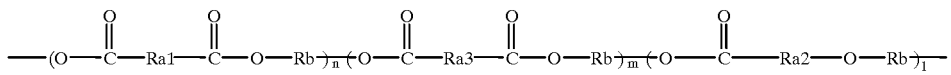
general formula (2)

wherein
Ra1 is an aromatic and/or aliphatic hydrocarbon group;
Ra2 a hydrocarbon group;
Ra3 is an aliphatic hydrocarbon group having a C=C bond;
Rb is a hydrocarbon group; and
l, m, n, p and q is a positive integer.

6. A high-strength, thinly insulated wire which comprises a conductor having an outer diameter of 1.0 mm or smaller covered with a coating layer having a thickness of from 0.1 to 0.5 formed from a resin composition mainly comprising a thermoplastic polyester resin which is represented by general formula (1) or (2) and has a melt index MI (measured at 230° C. under a load of 2.16 kg) of from 1 to 50, said thermoplastic polyester resin in the coating layer having been crosslinked:

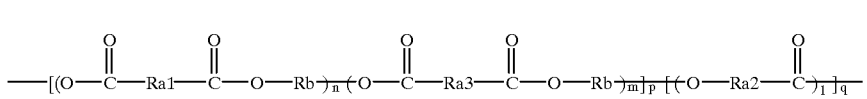
general formula (1)

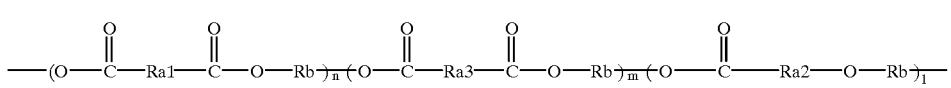
general formula (2)

wherein
Ra1 is an aromatic and/or aliphatic hydrocarbon group;
Ra2 is a hydrocarbon group;
Ra3 is an aliphatic hydrocarbon group having a C=C bond;
Rb is a hydrocarbon group; and
l, m, n, p and q each is a positive integer.

7. An electrically insulated cable comprising an insulated wire which has one or more cores and the periphery of which is covered with a coating layer formed from a resin composition mainly comprising a thermoplastic polyester resin which is represented by general formula (1) or (2) and has a melt index MI (measured at 230° C. under a load of 2.16 kg) of from 1 to 50, said thermoplastic polyester resin in the coating layer having been crosslinked:

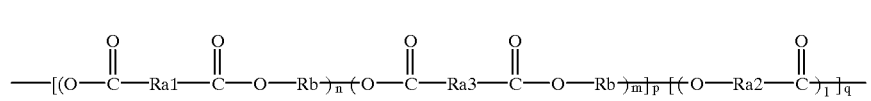
general formula (1)

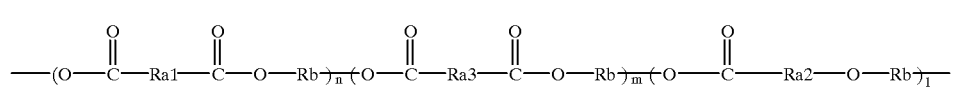
general formula (2)

wherein
Ra1 is an aromatic and/or aliphatic hydrocarbon group;
Ra2 is a hydrocarbon group;
Ra3 is an aliphatic hydrocarbon group having a C=C bond;
Rb is a hydrocarbon group; and
l, m, n, p and q each is a positive integer.

8. A heat-shrinkable tube produced by molding a resin composition mainly comprising a thermoplastic polyester resin into a tube, crosslinking the thermoplastic polyester resin constituting the tube, subsequently expanding the tube in the radial directions under heating conditions, and then cooling the tube to fix the expanded shape, said thermoplastic polyester resin being represented by formula (1) or (2) and having a melt index MI (measured at 230° C. under a load of 2.16 kg) of from 1 to 50:

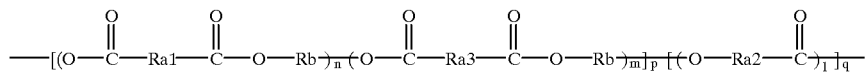
general formula (1)

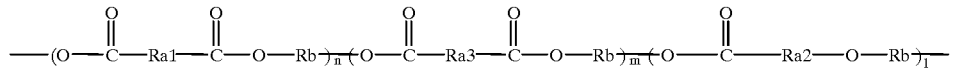
general formula (2)

wherein

Ra1 is an aromatic and/or aliphatic hydrocarbon group;

Ra2 is a hydrocarbon group;

Ra3 is an aliphatic hydrocarbon group having a C=C bond;

Rb is a hydrocarbon group; and l, m, n, p and q each is a positive integer.

* * * * *